US009328840B2

(12) United States Patent
Tsuchizawa

(10) Patent No.: US 9,328,840 B2
(45) Date of Patent: May 3, 2016

(54) SOLENOID VALVE

(75) Inventor: Toshiaki Tsuchizawa, Tokyo (JP)

(73) Assignee: Koganei Corporation, Tokyo (JP)

( * ) Notice: Subject to any disclaimer, the term of this patent is extended or adjusted under 35 U.S.C. 154(b) by 208 days.

(21) Appl. No.: 14/131,465

(22) PCT Filed: May 15, 2012

(86) PCT No.: PCT/JP2012/062387
§ 371 (c)(1),
(2), (4) Date: Feb. 4, 2014

(87) PCT Pub. No.: WO2013/008527
PCT Pub. Date: Jan. 17, 2013

(65) Prior Publication Data
US 2014/0151590 A1  Jun. 5, 2014

(30) Foreign Application Priority Data

Jul. 14, 2011  (JP) .................................. 2011-155978

(51) Int. Cl.
F01L 3/10 (2006.01)
F16K 31/06 (2006.01)
F16K 31/72 (2006.01)

(52) U.S. Cl.
CPC ......... *F16K 31/0679* (2013.01); *F16K 31/0655* (2013.01)

(58) Field of Classification Search
CPC ............ F16K 31/0684; F16K 31/0655; F16K 31/0658; F16K 31/0679
USPC ................... 251/129.09, 129.15, 129.16, 337
See application file for complete search history.

(56) References Cited

U.S. PATENT DOCUMENTS 1,754,740 A * 4/1930 Clarkson ................ F02M 69/04
                                                                239/585.2
2,911,183 A * 11/1959 Matthews ........... F16K 31/0655
                                                                251/129.02

(Continued)

FOREIGN PATENT DOCUMENTS

JP   H11132352 A    5/1999
JP   2000046223 A   2/2000

(Continued)

OTHER PUBLICATIONS

International Search Report for PCT Serial No. PCT/JP2012/062387 dated Jul. 31, 2012.

*Primary Examiner* — John Fox
*Assistant Examiner* — Seth W Mackay-Smith
(74) *Attorney, Agent, or Firm* — McCormick, Paulding & Huber LLP

(57) ABSTRACT

A solenoid is operated so as to be switched between a closed valve state in which the valve element is brought into contact with the valve seat by application of a spring force and an open valve state in which an electric current is passed through a coil (16) and the valve element is separated from the valve seat by a magnetic force. A fixed iron core (15) has a U-shape, and magnetically-attracting surfaces (26) are provided on respective ends thereof. A resin case (17) into which the fixed iron core (15) and the coil (16) are incorporated is provided with a bottom surface (27) having openings through which the magnetically-attracting surfaces (26) are exposed to the outside. A case contact surface (51) protruding toward a movable element in comparison with the magnetically-attracting surfaces (26) is formed on the bottom surface (27) of the case (17). Resin films (52) are provided on the respective magnetically-attracting surfaces (26).

8 Claims, 6 Drawing Sheets

(56) References Cited

U.S. PATENT DOCUMENTS

| | | | | |
|---|---|---|---|---|
| 4,502,031 A * | 2/1985 | Ito | ............................ | H01F 7/081 335/257 |
| 5,395,048 A * | 3/1995 | Ricco | .................... | F02M 47/027 239/533.8 |
| 5,947,442 A * | 9/1999 | Shurman | ............ | F02M 63/0017 251/129.16 |
| 6,598,944 B1 * | 7/2003 | Wolff | ....................... | B60T 8/363 303/119.2 |
| 6,848,669 B2 * | 2/2005 | Makino | ............... | F02M 63/0019 251/129.15 |
| 7,032,879 B2 * | 4/2006 | Hayashi | ............... | F16K 31/0679 251/129.09 |
| 7,404,541 B2 * | 7/2008 | Berger | ................ | F16K 31/0696 251/129.16 |
| 7,445,193 B2 * | 11/2008 | Fukano | ................ | F16K 31/0658 251/129.16 |
| 8,037,869 B2 * | 10/2011 | Ricco | .................... | F02M 47/027 123/472 |
| 2003/0042456 A1 | 3/2003 | Makino | | |
| 2004/0222397 A1 | 11/2004 | Hayashi | | |
| 2006/0017034 A1 | 1/2006 | Fukano et al. | | |

FOREIGN PATENT DOCUMENTS

| | | |
|---|---|---|
| JP | 2003156169 A | 5/2003 |
| JP | 2004116684 A | 4/2004 |
| JP | 2004293763 A | 10/2004 |
| JP | 2004332876 A | 11/2004 |
| JP | 2006038030 A | 2/2006 |
| JP | 2009014131 A | 1/2009 |

* cited by examiner

SOLENOID VALVE

TECHNICAL FIELD

The present invention relates to a solenoid valve for operating a valve element by a solenoid.

BACKGROUND ART

As one example of a solenoid valve for operating a valve element by a solenoid, a directional control valve for controlling an air flowing direction is known. As this directional control valve, an opening/closing valve for opening and closing a flow channel by the valve element, a switching valve for switching a flow channel, and the like are known. Supply and interruption of supplying of compressed air to a pneumatic circuit are controlled by the opening and closing valve, and a supplying direction of the compressed air is controlled by the switching valve. The solenoid valve has an electromagnet, i.e., a solenoid incorporated in a resin case and provided with a fixed iron core and a coil wound on the fixed iron core, and a valve body in which a movable element, i.e., an armature operating a valve element is incorporated, and the movable element is driven by the solenoid.

When the valve element is operated by the solenoid, an exposed surface of the fixed iron core serves as a magnetically-attracting surface for attracting an object by a magnetic force, so that the movable element is moved toward the magnetically-attracting surface. When the movable element is made to collide against a magnetically-attracting surface directly, a tendency in which the movable element sticks to the magnetically-attracting surface may become high, and it may become difficult for the movable element to be separated from the magnetically-attracting surface. Therefore, when a turning-on operation of the valve element is carried out against a spring force by supplying an electric current into the coil, and after that, a turning-off operation of the valve element is carried out by stopping the electric current, the response characteristics of the turning-off operation is decreased.

In order to improve the characteristics, a solenoid valve described in Patent Document 1 is provided with a nonmagnetic material film on a magnetically-attracting surface of a fixed iron core, a movable element is provided so as to abut on the fixed iron core via the nonmagnetic material film. In a solenoid valve described in Patent Document 2, a cushion having an abutting surface which protrudes in comparison with a magnetically-attracting surface of a fixed iron core is provided at a tip of the fixed iron core, and a movable element is provided so as to abut on the cushion without abutting on the magnetically-attracting surface. In a solenoid valve described in Patent Document 3, a magnetically-attracting surface of a fixed iron core is flush with a bottom surface of a bottom member, and when a movable element collides with the magnetically-attracting surface, an impact of the movable element to the magnetically-attracting surface is absorbed.

PRIOR ART DOCUMENTS

Patent Documents

Patent Document 1: Japanese Patent Application Laid-Open Publication No. 2003-156169
Patent Document 2: Japanese Patent Application Laid-Open Publication No. 2004-332876
Patent Document 3: Japanese Patent Application Laid-Open Publication No. H11-132352

SUMMARY OF THE INVENTION

Problems to be Solved by the Invention

As described in Patent Documents 1 and 2, the nonmagnetic material film is provided on the magnetically-attracting surface of the fixed iron core, and/or the cushion is provided at the tip of the fixed iron core, therefore, the movable element is kept from coming into contact directly with the fixed iron core when the movable element moves toward the fixed iron core, and then, provided is an advantage that response characteristics when the movable element is separated from the fixed iron core by stopping an electric current supplied into the coil is able to be enhanced. This advantage is able to enhance response characteristics as compared with not only the case where the abutting surface of the movable element is made to abut only on the magnetically-attracting surface of the fixed iron core, but also the case where the abutting surface of the movable element is made so as to abut on both of the magnetically-attracting surface and the bottom surface of the bottom member as described in Patent Document 3.

However, since nonmagnetic material films or the like are provided on the magnetically-attracting surface, nonmagnetic material films or the like abut on a part of the abutting surface of the movable element, and the abutting surface of the movable element is worn out partially in a concentrated manner due to the nonmagnetic material film. Consequently, durability enhancement of the solenoid valve is limited, and a replacement interval of the solenoid valve is not able to be lengthened.

An object of the present invention is to enhance durability while enhancing response characteristics of the solenoid valve.

Means for Solving the Problems

A solenoid valve which is operated so as to be switched between a closed valve state in which a valve element abuts on a valve seat by a spring member, and an open valve state in which a valve element is separated from the valve seat by a magnetic force against a spring force, the solenoid valve comprising: a fixed iron core having a magnetically-attracting surface; a resin case in which a coil wound around the fixed iron core and the fixed iron core are incorporated, the resin case having an opening through which the magnetically-attracting surface is exposed; a valve body attached to the case, a movable element being housed in a movable element housing chamber which is formed between the valve body and the case, the valve body and the movable element being operated in a unified fashion; a case side abutting surface which is formed in the case while protruding toward the movable element in comparison with the magnetically-attracting surface, and is opposed to the movable element; and a resin film provided on the magnetically-attracting surface, the resin film is provided with an iron core side abutting surface adjacent to the case side abutting surface, wherein the iron core side abutting surface is flush with the case side abutting surface, or arranged so as to protrude toward the movable element in comparison with the case side abutting surface.

Effects of the Invention

According to the present invention, since a resin film is provided on the magnetically-attracting surface of the fixed iron core, which is exposed through an opening of the bottom surface of the resin case, the movable element does not abut directly on the magnetically-attracting surface, therefore, it is possible to enhance response characteristics at the time of separating the movable element from the attracting surface. Moreover, the movable element is opposed also to the case side abutting surface of the case bottom surface, and the movable element abuts on the resin film in a state of being opposed to the magnetically-attracting surface and the case side abutting surface, and therefore, the durability of the solenoid valve is able to be enhanced without partial wearing arising in the resin film and the case side abutting surface. In particular, when two magnetically-attracting surfaces are exposed on the bottom surface of the case with the fixed iron core formed in a U-shape, an area of the attracting surface provided in the movable element while being opposed to the magnetically-attracting surface is able to be made large, and partial wearing is able to be prevented from arising in the resin film and the case side abutting surface.

BEST MODE FOR CARRYING OUT THE INVENTION

Figure 1:
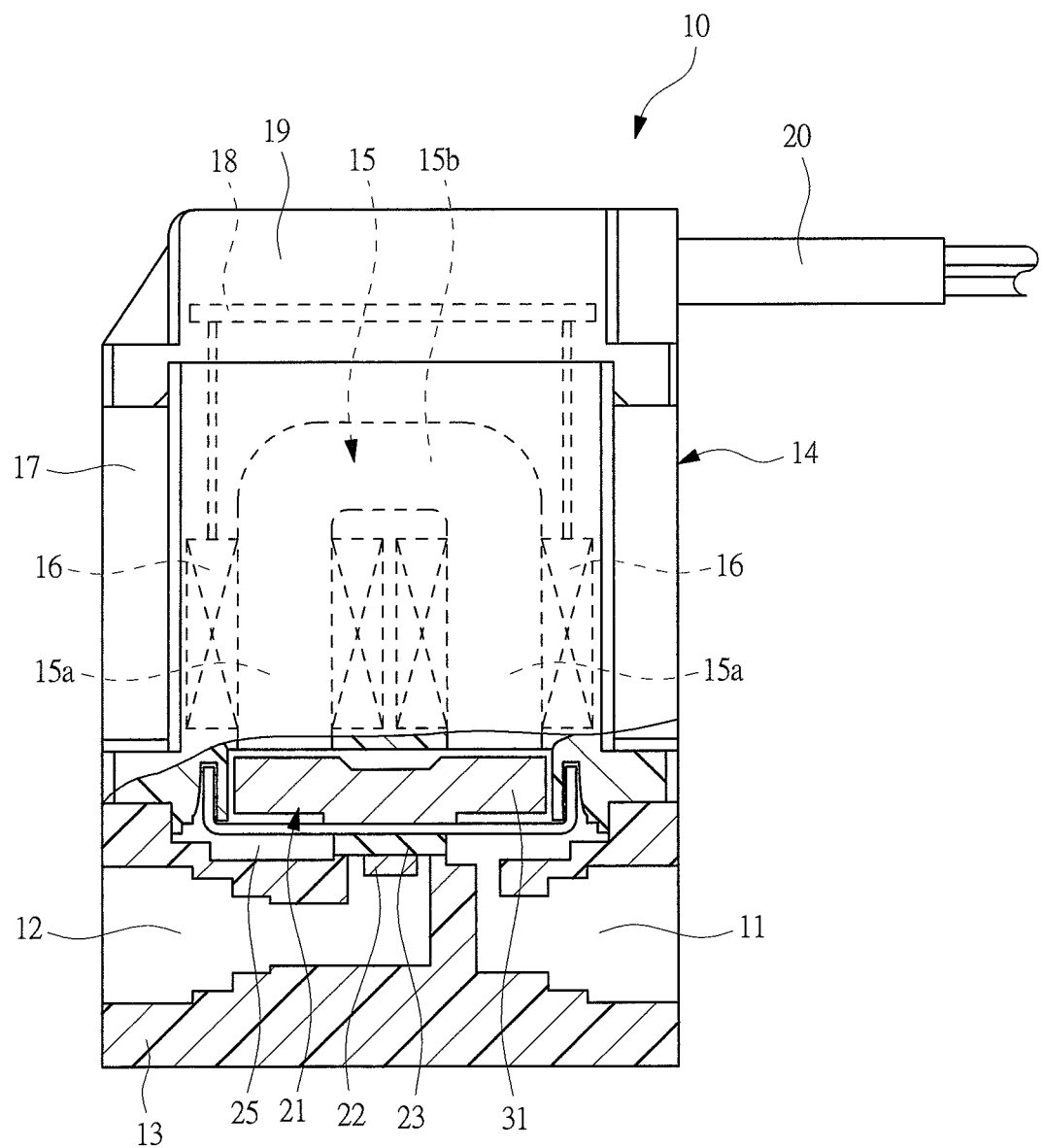
FIG. 1 is a partially cutaway front view showing a solenoid valve according to one embodiment of the present invention.

Hereinafter, embodiments of the present invention will be described in detail on the basis of the drawings. As shown in FIG. 1, a solenoid valve 10 has a valve body 13 in which an inflow port 11 and an outflow port 12 are formed. This solenoid valve 10 is a directional control valve for opening and closing a flow channel which makes the inflow port 11 and outflow port 12 communicate with each other, so as to be switched between a state where gas is supplied from the inflow port 11 to the outflow port 12 and a state where gas is not supplied.

A solenoid 14 is attached to the block-shaped valve body 13 formed with the ports, and the solenoid 14 has a fixed iron core 15 and a coil 16, and these are incorporated in a resin case 17. This case 17 is formed by a metallic mold for resin molding with the fixed iron core 15 and the coil 16 being incorporated in it. The fixed iron core 15 is provided with two parallel portions 15a extending in parallel with each other and a connecting portion 15b connecting the parallel portions 15a to each other, and formed into a U-shape. The coil 16 is wound around the parallel portions 15a of the fixed iron core 15. A control board 18 is provided in the case 17, and the control board 18 is provided with a drive circuit for controlling a driving current applied to the coil 16. The control board 18 is covered by a wire cover 19 attached to the case 17. A cable 20 for supplying the driving current from the outside is attached to the wiring cover 19.

A movable element assembly 21 is arranged between the valve body 13 and the solenoid 14, and the movable element assembly 21 has a valve element 23 for opening and closing a valve seat 22 formed between the inflow port 11 and the outflow port 12. When the valve element 23 abuts on the valve seat 22, the inflow port 11 and the outflow port 12 are blocked from communicating with each other, and gas is blocked from flowing from the inflow port 11 to the outflow port 12. When the valve element 23 is separated from the valve seat 22, gas is supplied to the outflow port 12 from the inflow port 11.

Figure 2:
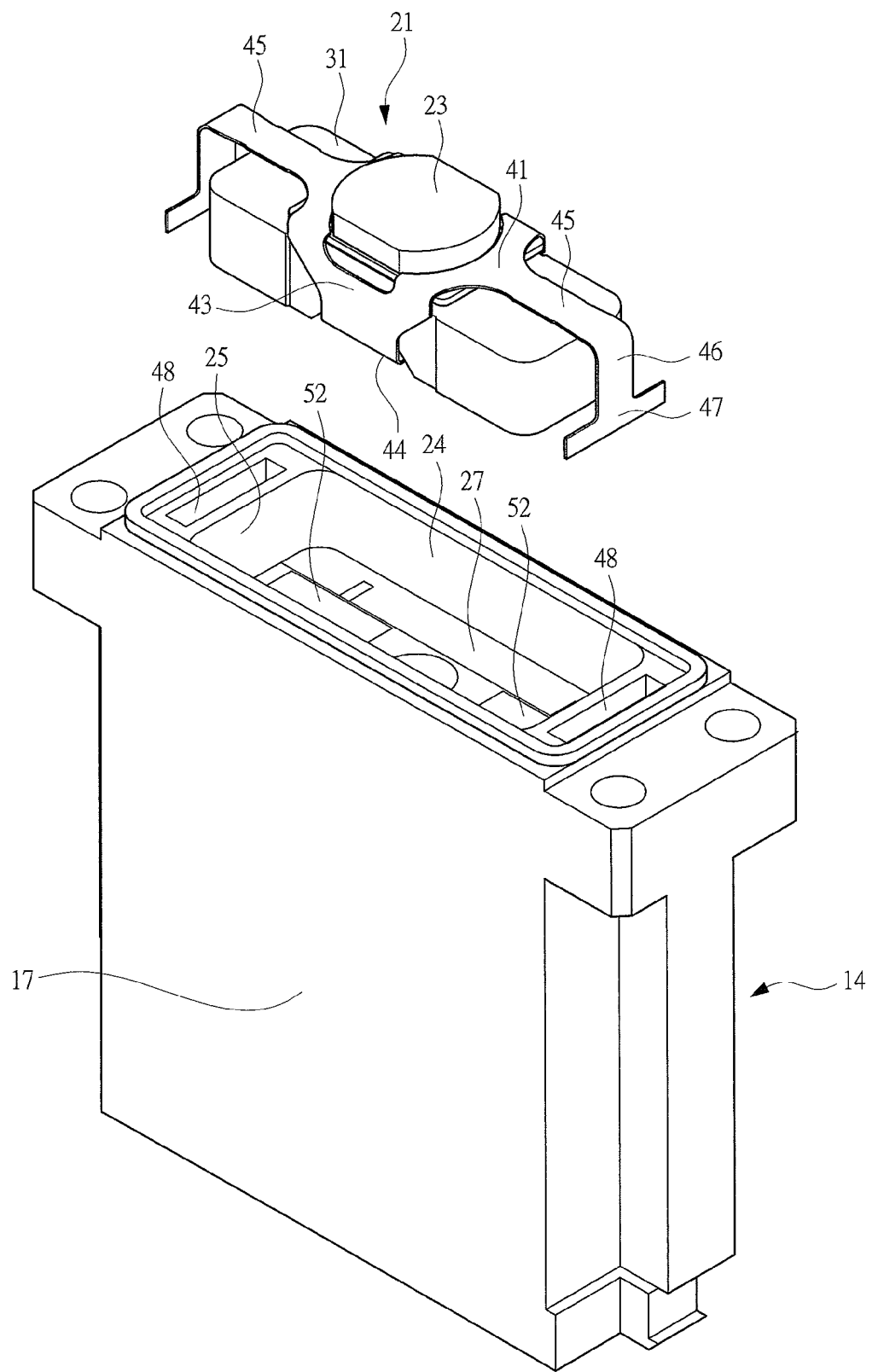
FIG. 2 is a perspective view showing a solenoid valve and a movable element assembly shown in FIG. 1.
Figure 3:
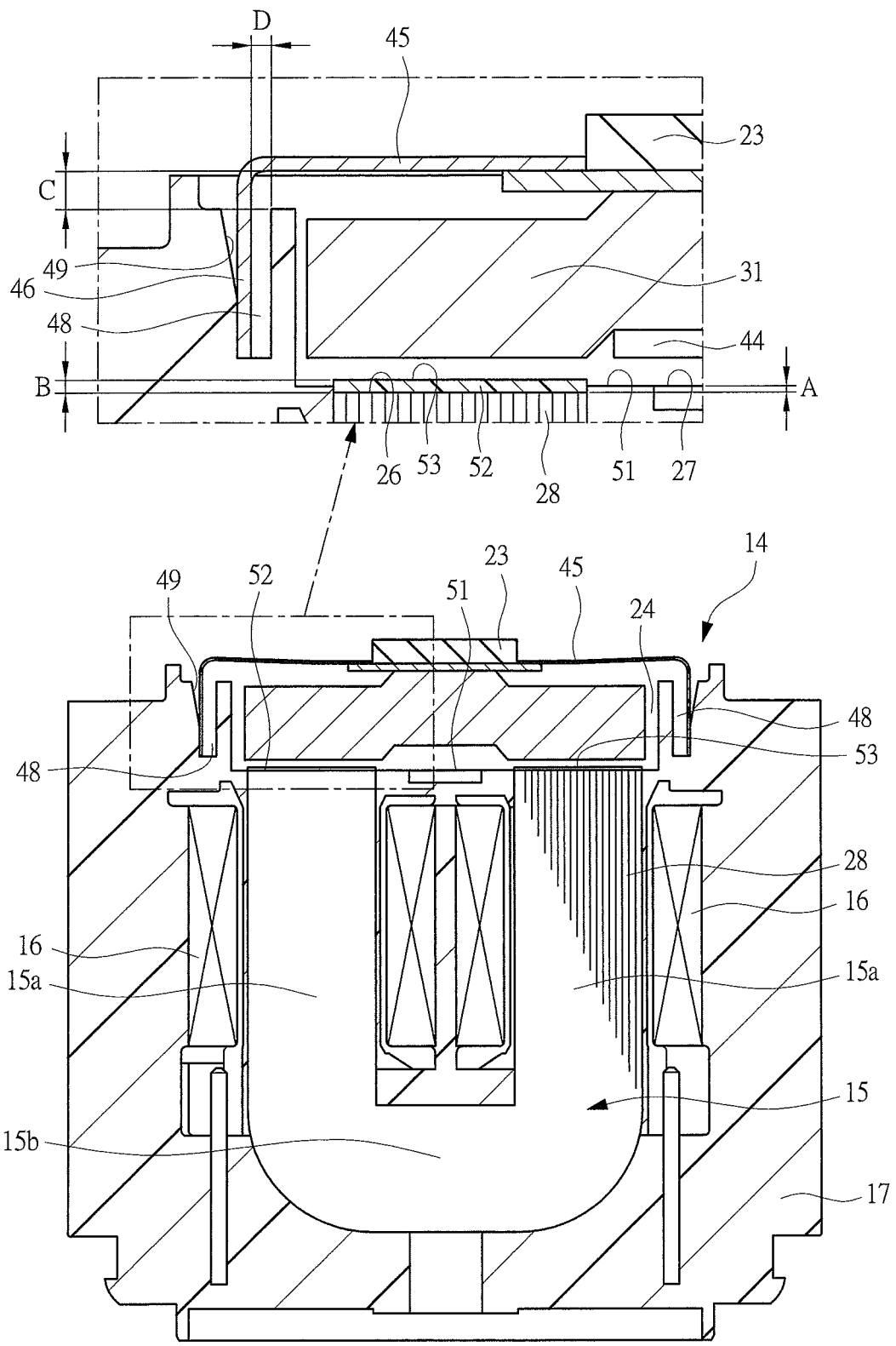
FIG. 3 is a sectional view of the solenoid shown in FIG. 2.
Figure 4:
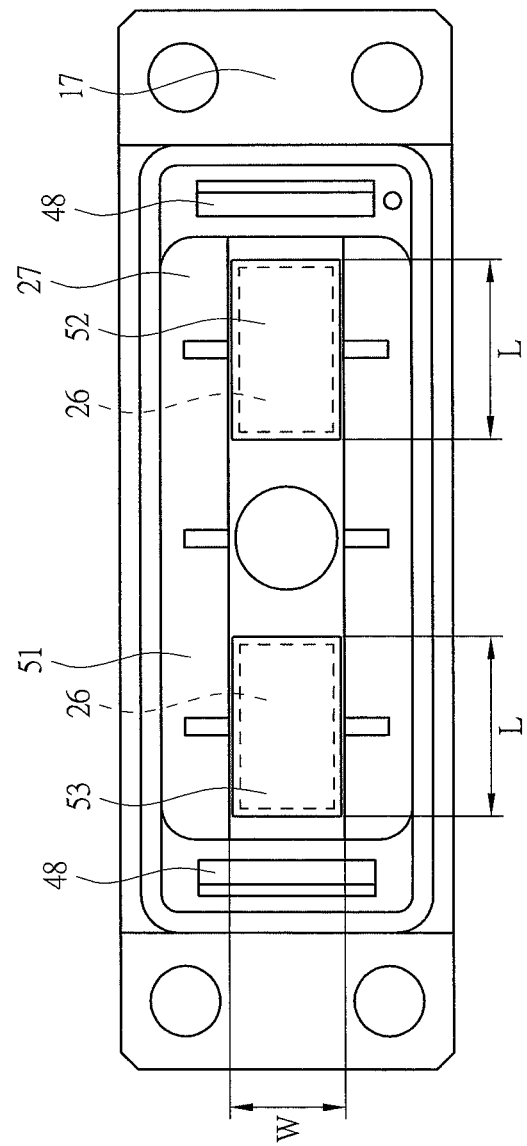
FIG. 4 is a plan view of a magnetically-attracting surface side of the solenoid shown in FIG. 3.

FIGS. 2 and 3 show the solenoid 14 turned upside down with respect to the attitude shown in FIG. 1. The solenoid 14 is formed with a concave portion 24 for the purpose of incorporating the movable element assembly 21, and when the valve body 13 is attached to the solenoid 14, a movable element housing chamber 25 is formed by the solenoid 14 and the valve body 13 while the concave portion 24 is covered with the valve body 13. The fixed iron core 15 is formed into a U-shape as shown in FIG. 3, and both ends thereof are formed as respective magnetically-attracting surfaces 26. As shown in FIGS. 3 and 4, the magnetically-attracting surfaces 26 are exposed from a bottom surface 27 of the case 17 and adjacent to the bottom surface 27 of the concave portion 24. Each magnetically-attracting surface 26, as shown in FIG. 4, is formed into a rectangle which has a long side in a longitudinal direction of the solenoid 14. When the length of the magnetically-attracting surface 26 is represented by a character "L", and the width is represented by a character "W", the two magnetically-attracting surfaces 26 is adjacent to each other in the longitudinal direction. The fixed iron core 15, as shown in FIG. 3, is formed with grain oriented silicon steel sheets 28 stacked. Each of the silicon steel sheets 28 is oriented toward the width direction of the magnetically-attracting surface 26, and stacked in the direction of the length "L" of the magnetically-attracting surface 26. Besides, the fixed iron core 15 may be also fabricated by not only one method of stacking grain oriented silicon steel sheets in layers, but also another methods such as machining of an iron material, press fabricating by a general silicon steel sheet, using a special steel plate which is amorphous, using a high-pressure molding product like a dust core, and molding by sintering.

Figure 5:
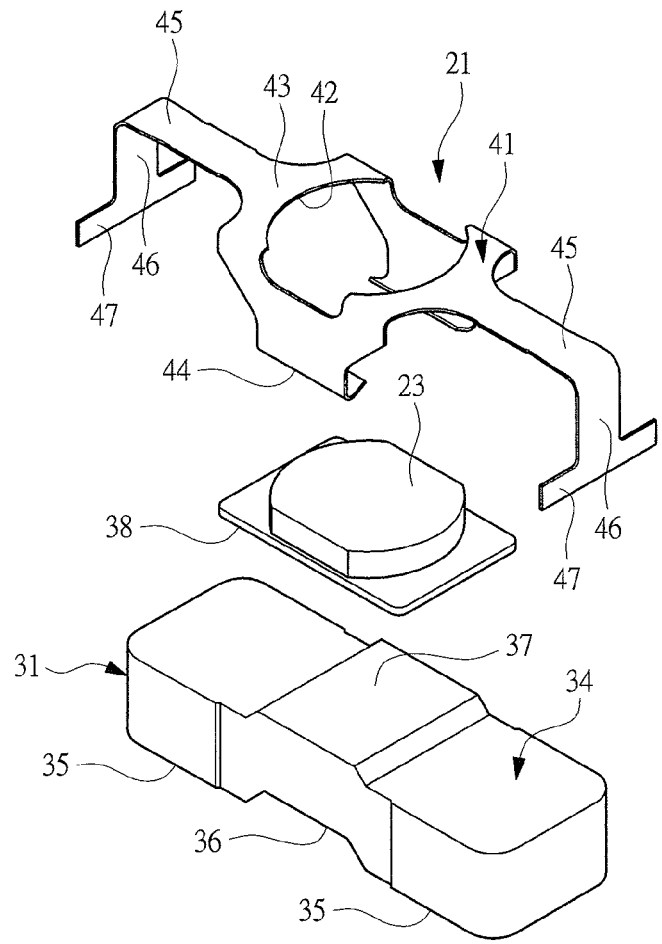
FIG. 5 is an exploded perspective view of the movable element assembly shown in FIG. 2.
Figure 6:
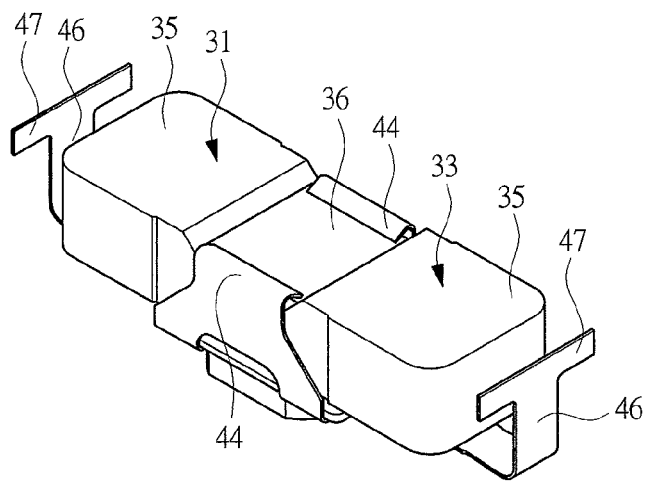
FIG. 6 is a perspective view showing an abutting surface side of the movable element assembly shown in FIG. 2.

The movable element assembly 21, as shown in FIGS. 5 to 7, has a movable element 31 like a bar, and to the movable element 31, the valve element 23 which is made of rubber is attached. One surface of the movable element 31, as shown in FIG. 6, is formed to be an opposing surface 33 which is opposed to the bottom surface 27 of the case 17, and the opposite surface is formed to be a valve element mounting surface 34 as shown in FIG. 5. On both ends of the opposing surface 33 of the movable element 31, an abutting surface 35 opposed to the magnetically-attracting surface 26 of the fixed iron core 15 is formed. Between both abutting surfaces 35, a concave portion 36 is formed, and in agreement with this concave portion 36, a valve element attaching surface 37 is provided in the center section in the longitudinal direction of the valve element mounting surface 34, and the valve element attaching surface 37 protrudes toward the valve element 23 in comparison with both ends of the valve element mounting surface 34.

The valve element 23 is fixed to a metal base plate 38, and the base plate 38 is fixed to the valve element attaching surface 37. On the same side of the valve element mounting surface 34 of the movable element 31, a plate spring 41 is arranged and attached to it. A longitudinally-center portion of the plate spring 41 has an annular movable-element fixing-portion 43 formed with a through-hole 42 through which the valve element 23 protrudes, and the base plate 38 attached with the valve element 23 is fixed on the movable element 31 by the movable-element fixing-portion 43. The movable-element fixing-portion 43 is provided with a claw portion 44 which is fixed to the concave portion 36 of the opposing surface 33 while covering both side surfaces of the movable element 31.

The plate spring 41 has a strip portion 45 which extends along with the movable element 31 from the movable-element fixing-portion 43, and its end portion is provided with a leg portion 46 which is bent along the end surface of the movable element 31. A tip of the leg portion 46 is provided with a holding portion 47 which extends in the width direction of the case 17, and the leg portion 46 and the holding portion 47 are formed into a T-shape as shown in FIG. 5. As shown in FIGS. 3 and 4, the case 17 is formed with an engaging groove 48 into which the leg portion 46 is inserted.

Figure 7A:
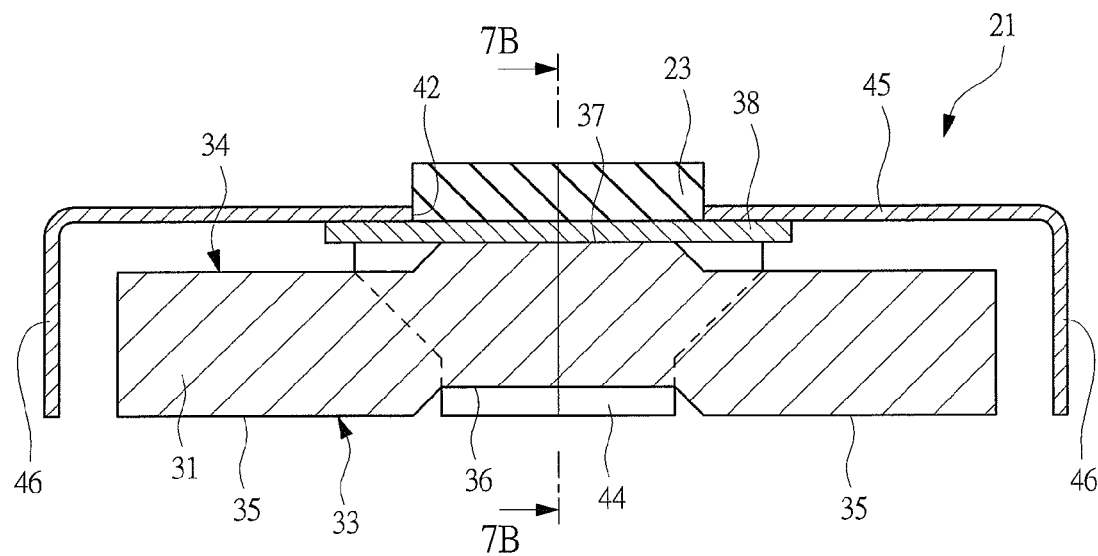
FIG. 7A is a longitudinal sectional view of the movable element assembly.
Figure 7B:
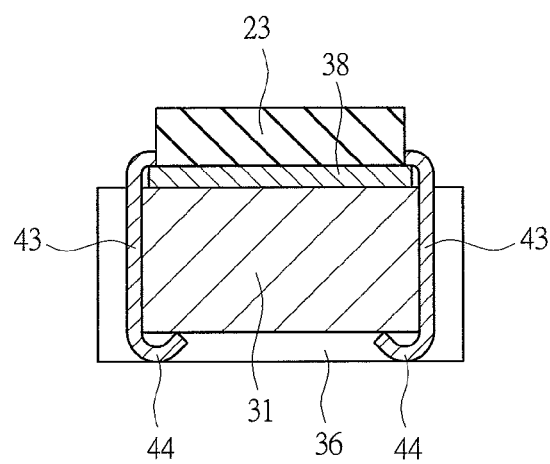
FIG. 7B is a sectional view taken along a line 7B-7B in FIG. 7B.

As shown in FIG. 5, the movable element assembly 21 is made up of the movable element 31, the valve element 23 and the plate spring 41. While the base plate 38 to which the valve element 23 is adhered by baking finish is sandwiched between the movable element 31 and the plate spring 41, the claw portion 44 provided in the annular movable-element fixing-portion 43 is unfolded and hung on the concave portion 36, and whereby, the movable element assembly 21 is assembled as shown in FIGS. 6, 7A and 7B. Under the state where the movable element assembly has been assembled, the movable-element fixing-portion 43 is welded, by spot welding, to the side surface of the movable element 31. As the movable element assembly 21 is shown in FIG. 2, the leg portion 46 is inserted into the engaging groove 48 of the case 17 while the opposing surface 33 is opposed to the bottom surface 27, and then, the movable element assembly 21 is attached to the case 17. Under the state where the leg portion 46 has been inserted into the engaging groove 48, the holding portion 47 abuts on the bottom surface of the engaging groove 48. As shown in FIG. 3, the strip portion 45 of the plate spring 41 has a clearance "C" provided without touching at the case 17. In addition, the outside surface of the leg portion 46 closely contacts the outside surface of the engaging groove 48, and a clearance "D" is provided between the inside surface of the leg portion 46 and the inside surface of the engaging groove 48. Since the outside surface of the leg portion 46 closely contacts the outside surface of the engaging groove 48, the movable element assembly 21 does not move in the longitudinal direction with respect to the case 17, and therefore, the mutual position between the valve element 23 and the valve seat 22 is fixed. In addition, also when an electric current is made to flow through the solenoid 14 and the movable element 31 contacts the magnetically-attracting surface 26 and the plate spring 41 bends, the plate spring 41 does not contact anywhere owing to the clearance "C" and clearance "D", and therefore, a secure operation as the plate spring 41 is ensured, and furthermore, wearing does not occur either because there is no contact. In the engaging groove 48, a guide slope 49 is provided so that the leg portion 46 may be inserted easily. The holding portion 47 of the plate spring 41 is made be long in the width direction, and the holding portion 47 touches the whole bottom surface of the engaging groove 48, and therefore, the movable element assembly 21 is prevented from inclining and moving to the width direction of the case 17. Therefore, the valve element 23 closes the whole valve seat 22 surely without inclining against the valve seat 22.

As shown in FIG. 3, a case side abutting surface 51 is provided on the bottom surface 27 of the case 17 so as to protrude in comparison with the magnetically-attracting surface 26 toward the movable element 31, and a resin film 52 is provided on the magnetically-attracting surface 26. The resin film 52 is formed of a tape made from polyimide, and the resin film 52 having a size corresponding to a size of the magnetically-attracting surface 26 is adhered to the magnetically-attracting surface 26 by an adhesive. The surface of the resin film 52 serves as an abutting surface 53, and the abutting surface 53 of the resin film 52 is adjacent to the case side abutting surface 51. The abutting surface 35 of the movable element 31 is configured to be larger than the area of the magnetically-attracting surface 26, and the abutting surface 35 is opposed to the resin film 52, and at the same time, is also opposed to the case side abutting surface 51 located in the outside thereof.

A level difference dimension "A" between the magnetically-attracting surface 26 and the case side abutting surface 51 is configured to be approximately 50 to 125 μm (micrometers), and when the resin film 52 in which a thickness dimension "B" is the same as 50 to 125 μm, or is a little thicker than 50 to 125 μm is provided on the magnetically-attracting surface 26, the abutting surface 53 of the resin film 52 protrudes a little toward the movable element 31 in comparison with the case side abutting surface 51 when the solenoid valve is manufactured.

When a turning on operation of the solenoid valve is carried out and an electric current is supplied into the coil 16, as for the movable element 31, the abutting surface 35 at the longitudinal-direction both-ends of the movable element 31 moves, while resisting the spring force of the plate spring 41, toward the magnetically-attracting surface 26 at both ends of the fixed iron core 15. Therefore, the valve element 23 is separated from the valve seat 22, and compressed air is supplied from the inflow port 11 to the outflow port 12. Since the resin film 52 is provided on the magnetically-attracting surface 26, the movable element 31 is made to abut on the iron core side abutting surface 53 of the resin film 52, and the movable element 31 is prevented from contacting directly the magnetically-attracting surface 26 which is the end surface of the fixed iron core 15. Therefore, when a turning off operation of the solenoid valve is carried out and an electric current supplied into the coil 16 is stopped, the movable element 31 is promptly driven to the valve seat 22 side by the spring force of the plate spring 41 without the movable element 31 and the fixed iron core 15 adhering to each other due to residual magnetism, and the valve element 23 abuts on the valve seat 22. In this way, the movable element 31 does not abut directly on the magnetically-attracting surface 26 of the fixed iron core 15 at the time of the ON-operation of the solenoid valve, and therefore, response characteristics at the time of making the movable element 31 separated from the magnetically-attracting surface 26 is able to be enhanced.

The abutting surface 35 of the movable element 31 is opposed to the magnetically-attracting surface 26 of the fixed iron core 15, and at the same time, is also opposed to the case side abutting surface 51, and therefore, when an electric current is supplied into the coil 16 and the movable element 31 moves toward the magnetically-attracting surface 26, the movable element 31 abuts on the resin film 52 as mentioned above. When the resin film 52 is worn out due to accumulation of operation frequency as the solenoid valve, the abutting surface 35 of the movable element 31 abuts on the resin film 52 and the case side abutting surface 51, and therefore, the whole of the abutting surface 35 abuts. When the abutting area becomes wide, the durability of the solenoid valve is able to be enhanced. In particular, the abutting surface 35 of the movable element 31 has a size larger than the width dimension of the magnetically-attracting surface 26, and the case side abutting surface 51 has a portion opposed to the abutting surface 35. That is, the case side abutting surface 51 is provided on, at least, both sides of the iron core side abutting surfaces 53, and the abutting surface 35 abuts on the case side abutting surface 51 at both sides of the resin film 52, and abuts on the resin film 52, therefore, it is possible to enhance the durability of the solenoid valve while preventing the movable element 31 from being partially worn out.

The present invention is not limited to the above-mentioned embodiments, and will be able to be variously modified in the range not departing from the substance. For example, a shape of the fixed iron core 15 may be formed into not only a U-shape as shown in figures, but also an I-shape.

INDUSTRIAL APPLICABILITY

This solenoid valve is applied in order to control supplying compressed air for a pneumatic circuit.

What is claimed is:

1. A solenoid valve which is operated so as to be switched between a closed valve state in which a valve element abuts on a valve seat by a spring member, and an open valve state in which a valve element is separated from the valve seat by a magnetic force against a spring force, the solenoid valve comprising:
    a fixed iron core having a magnetically-attracting surface;
    a resin case in which a coil wound around the fixed iron core and the fixed iron core are incorporated, the resin case having an opening through which the magnetically-attracting surface is exposed;
    a valve body attached to the case, a movable element being housed in a movable element housing chamber which is formed between the valve body and the case, the valve body and the movable element being operated in a unified fashion;
    an abutting surface which is formed in the case while protruding toward the movable element in comparison with the magnetically-attracting surface, and is opposed to the movable element; and
    a resin film provided on the magnetically-attracting surface, the resin film is provided with an abutting surface adjacent to the abutting surface of the case,
    wherein the abutting surface of the resin film is flush with the abutting surface of the case, or arranged so as to protrude toward the movable element in comparison with the abutting surface of the case.

2. The solenoid valve according to claim 1, wherein the fixed iron core has a U-shape, and each end of the fixed iron core is provided with the magnetically-attracting surface.

3. The solenoid valve according to claim 2, wherein the abutting surface of the case is provided on, at least, both sides of the abutting surface of the resin film.

4. The solenoid valve according to claim 1, wherein the valve seat is formed on the valve body, and the movable element is provided with the valve element.

5. A solenoid valve which is operated so as to be switched between a closed valve state in which a valve element abuts on a valve seat by a spring member, and an open valve state in which a valve element is separated from the valve seat by a magnetic force against a spring force, the solenoid valve comprising:
    a fixed iron core having a magnetically-attracting surface;
    a resin case in which a coil wound around the fixed iron core and the fixed iron core are incorporated, the resin case having an opening through which the magnetically-attracting surface is exposed; and
    a valve body attached to the case, a movable element being housed in a movable element housing chamber which is formed between the valve body and the case, the valve body and the movable element being operated in a unified fashion, the movable element having a valve element mounting surface opposite an opposing surface that opposes the resin case and having side surfaces that join the valve element mounting surface with the opposing surface;
    wherein the spring member is a plate spring which has: a strip portion extending along the movable element, a leg portion arranged at one end of the strip portion, and which is held in an engaging groove of the case, and a claw portion which is fixed to the opposing surface of the movable element while covering both side surfaces of the movable element.

6. The solenoid valve according to claim 5, wherein
    a clearance is provided between the strip portion of the plate spring and the case,
    a clearance is provided between an inside surface of the leg portion and an inside surface of the engaging groove, and
    the leg portion is inserted into the engaging groove with an outside surface of the leg portion closely contacting an outside surface of the engaging groove.

7. The solenoid valve according to claim 5, wherein, in the engaging groove, a guide slope is provided so that the leg portion is inserted.

8. The solenoid valve according to claim 5, wherein the leg portion has a holding portion which extends in a width direction of the case and abuts on a bottom surface of the engaging groove, and the holding portion preventing the movable element from being inclined in a width direction.

\* \* \* \* \*